United States Patent
Magara

(10) Patent No.: US 8,160,419 B2
(45) Date of Patent: Apr. 17, 2012

(54) OPTICAL DISK DEVICE

(75) Inventor: Sho Magara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1184 days.

(21) Appl. No.: 11/942,392

(22) Filed: Nov. 19, 2007

(65) Prior Publication Data
US 2008/0131096 A1    Jun. 5, 2008

(30) Foreign Application Priority Data
Dec. 5, 2006  (JP) .................................. 2006-327825

(51) Int. Cl.
  H04N 5/765    (2006.01)
  H04N 9/80    (2006.01)
(52) U.S. Cl. ...................... 386/232; 386/126; 386/248
(58) Field of Classification Search .......................... None
  See application file for complete search history.

(56) References Cited

U.S. PATENT DOCUMENTS

| | | | |
|---|---|---|---|
| 6,492,982 B1 * | 12/2002 | Matsuzaki et al. ............ | 345/204 |
| 6,771,888 B1 * | 8/2004 | Cookson et al. ............. | 386/232 |
| 7,136,042 B2 * | 11/2006 | Magendanz et al. .......... | 345/100 |
| 2004/0213542 A1 * | 10/2004 | Hamasaka et al. ............ | 386/46 |

FOREIGN PATENT DOCUMENTS

| | | |
|---|---|---|
| JP | 2000-112447 | 4/2000 |
| JP | 2001274985 | 10/2001 |
| JP | 2006-319502 | 11/2006 |

OTHER PUBLICATIONS

Japanese Office Action dated Dec. 14, 2010.

* cited by examiner

*Primary Examiner* — William Powers
(74) *Attorney, Agent, or Firm* — Pillsbury Winthrop Shaw Pittman, LLP

(57) ABSTRACT

An optical disk device includes a read means which reads an image signal from an optical disk, and a conversion means which converts this image signal to one designated resolution. Furthermore, this optical disk device is connected to a display device which displays an image of this converted image signal. Moreover, this optical disk device includes an actuation means which receives input of one resolution among the first plurality of resolutions. And this optical disk device also includes a control means which acquires a second plurality of resolutions from the display device. And, when one resolution is inputted by the actuation means, this control means decides whether or not this input resolution is included in the second plurality of resolutions. Moreover, if it has been decided that the input resolution is included in the second plurality of resolutions, the control means designates that input resolution to the conversion means.

4 Claims, 3 Drawing Sheets

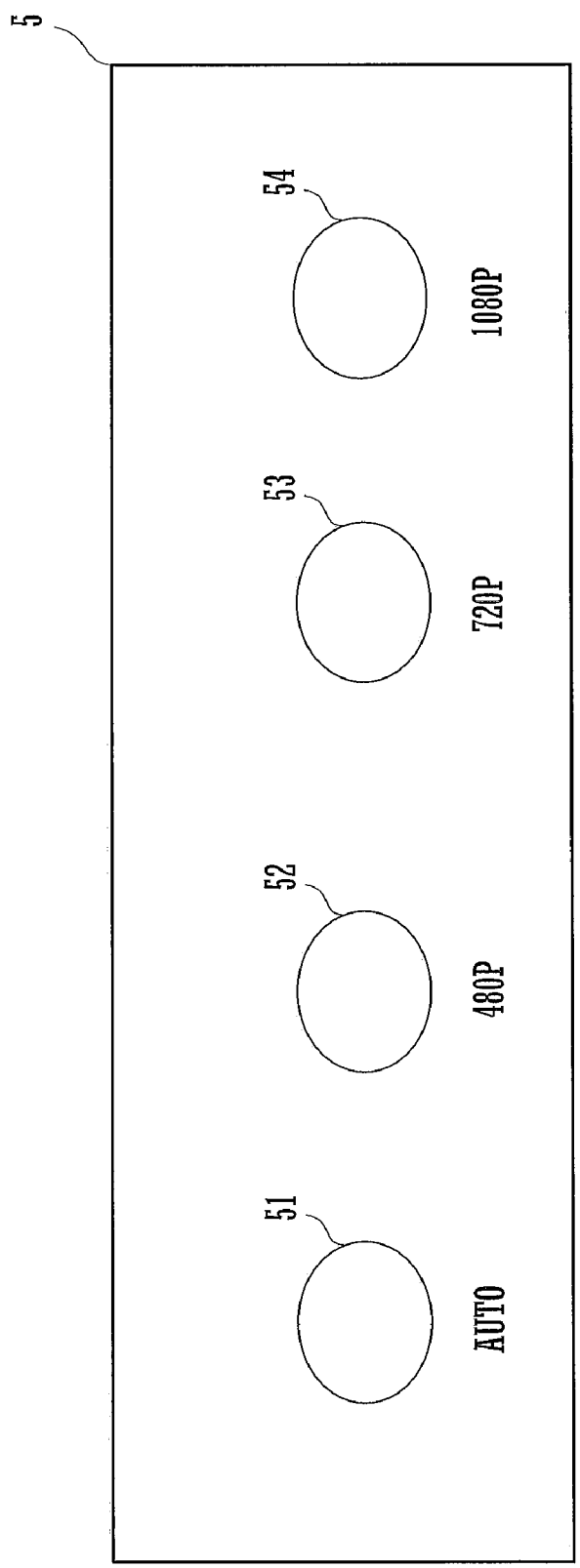

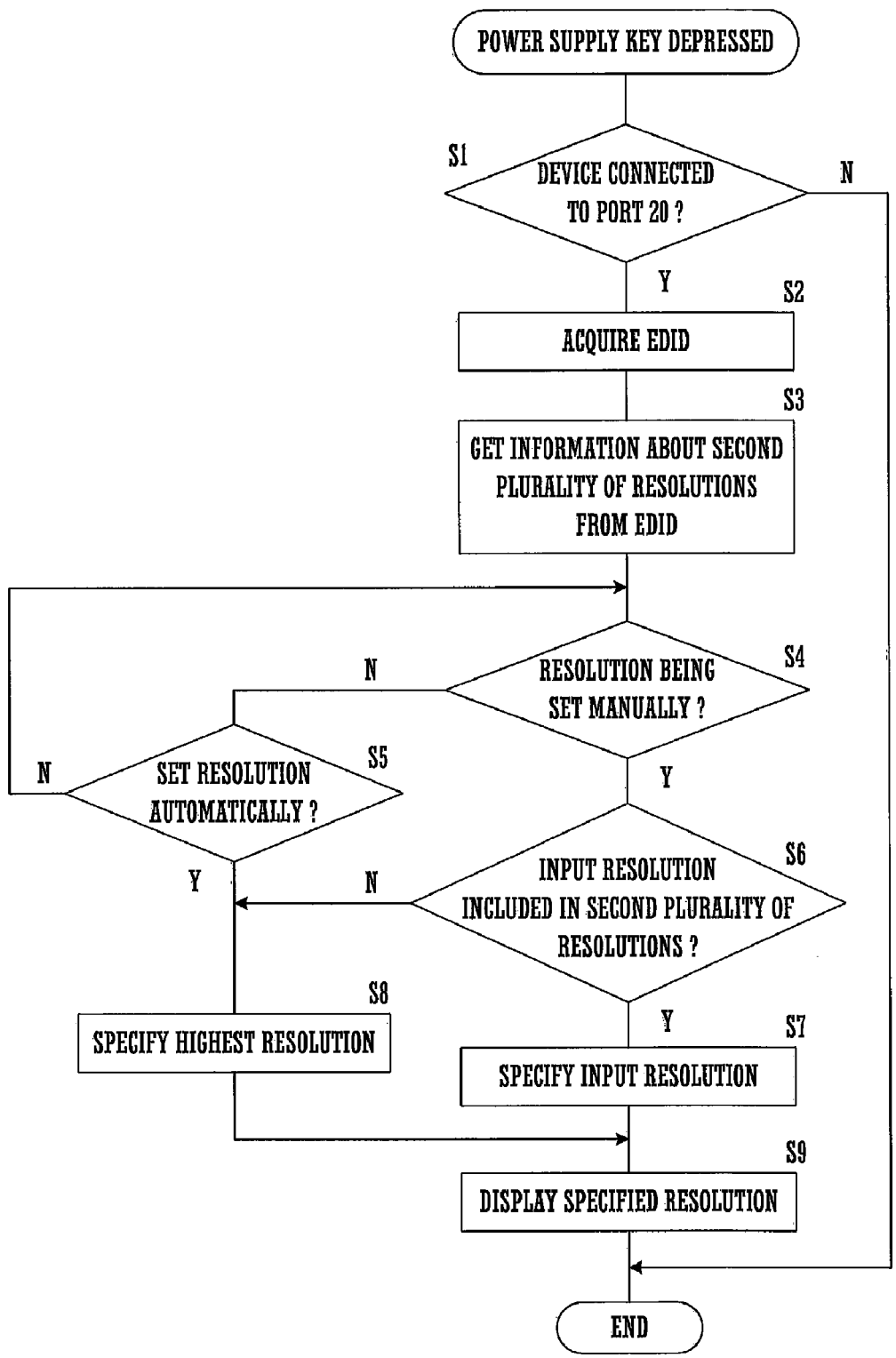

OPTICAL DISK DEVICE

CROSS REFERENCE

This Nonprovisional application claims priority under 35 U.S.C. §119(a) on Patent Application No. 2006-327825 filed in Japan on Dec. 5, 2006, the entire contents of which are hereby incorporated by reference.

BACKGROUND OF THE INVENTION

The present invention relates to an optical disk device which converts an image signal read in from an optical disk to a specified resolution, and outputs it.

In the prior art, optical disk devices which replay images and audio recorded upon optical disks, such as CDs, DVDs, Blu-ray disks and the like have become generally widespread.

In recent years, it has become common to connect this type of optical disk device to a display device which displays the replay image via a bidirectional type interface. An example of such a bidirectional type interface is the HDMI (High Definition Multimedia Interface). The display device may be, for example, a monitor which is compatible with the HDMI standard, or a television which is compatible with the HDMI standard. Upon this display device, the user is able to view an image based upon the image signal outputted from the optical disk device, and to hear audio based upon the audio signal likewise outputted therefrom.

With this kind of optical disk device, the resolution of the image which is recorded upon the optical disk and the resolution with which the display device is compatible do not necessarily agree with one another. Due to this, the optical disk device does not output the image signal which is recorded upon the hard disk just as it is, but instead automatically converts said image signal to a resolution which the display device can display. And thereafter the optical disk device outputs this converted image signal to the optical disk device.

In particular, with the HDMI standard, an optical disk device is able to acquire, from a display device, a plurality of resolutions with which the display device is compatible. Due to this, the optical disk device outputs the image signal to the display device, after having automatically converted it to the highest one among said plurality of resolutions.

However, at the display device on the reception side, there is a native resolution at which it can output at its best quality. Due to this, its highest resolution is not its resolution at which it outputs at its best quality. Moreover, a greater time period is required for processing an image signal at high resolution, than for processing an image signal at a lower resolution. Because of this, the user is sometimes obliged to wait during this greater time period, which is not desirable.

Accordingly, in the light of these facts, it is sometimes not desirable from the point of view of the user for the image signal to be converted to the highest resolution of which the display device is capable.

Accordingly an image capture and display device has been proposed in Japanese Laid-Open Patent Publication 2001-274985, upon which the resolution is set manually. This image capture and display device is connected to a monitor via an interface. And this image capture and display device includes an actuation unit which receives input of a desired resolution. Moreover, this image capture and display device converts its image signal to the resolution which has thus been inputted via the actuation unit, and then outputs this converted image signal to the monitor.

However, the image capture and display device and the monitor which are described in the above identified Japanese Patent Publication 2001-274985 are connected together via an interface which is only capable of one way (unidirectional) communication. Due to this, the image capture and display device is not capable of discovering, with which resolutions the display device is and is not compatible.

Accordingly, with the image capture and display device described in the above identified Japanese Patent Publication 2001-274985, the problem arises that, if the user undesirably inputs a resolution with which the monitor is not compatible, the replay image cannot be displayed upon the monitor in an adequate manner. In this case, the user may not understand the cause of the problem, and may even consider making a complaint or a claim to the sales outlet, from which he purchased the image capture and display device.

The objective of the present invention is to provide an optical disk device upon which the resolution can be set manually, and moreover with which it is possible to display a replay image upon a display device in an adequate manner.

SUMMARY OF THE INVENTION

The optical disk device according to the present invention includes a read means which reads an image signal from an optical disk. Here the optical disk may be, for example, a DVD or a Blu-ray disk.

Furthermore, this optical disk device includes a conversion means which converts the image signal read by the read means to one resolution among a first plurality of resolutions.

Moreover, this optical disk device includes a bidirectional type interface which is connected to a display device which processes said image signal converted by said conversion means, and which displays an image upon a screen. Here the interface is, for example, the HDMI interface. Moreover the display device is, for example, a television or a monitor.

And this optical disk device further includes an actuation means which receives input of one resolution among the first plurality of resolutions.

Yet further, this optical disk device also includes a control means which acquires from the display device, via the interface, a second plurality of resolutions with which the display device is compatible. Here, this control means may acquire this second plurality of resolutions at which the display device can perform display by EDID, which is a HDMI standard.

And, when one resolution is inputted by the actuation means, this control means decides whether or not this input resolution is included in the second plurality of resolutions which have been acquired. Moreover, if it has been decided that the input resolution is included in the second plurality of resolutions, then the control means designates this input resolution to the conversion means. As a result, the conversion means converts the image signal which has been read by the read means to the input resolution. And an image at the input resolution is displayed upon the display device.

BRIEF DESCRIPTION OF THE DRAWINGS

FIG. 2 is an external view of an actuation unit 5 of this optical disk device which is an embodiment of the present invention; and FIG. 3 is a flow chart showing the flow of operations performed by a control unit 4 of this optical disk device which is an embodiment of the present invention.

DETAILED DESCRIPTION OF THE INVENTION

Figure 1:
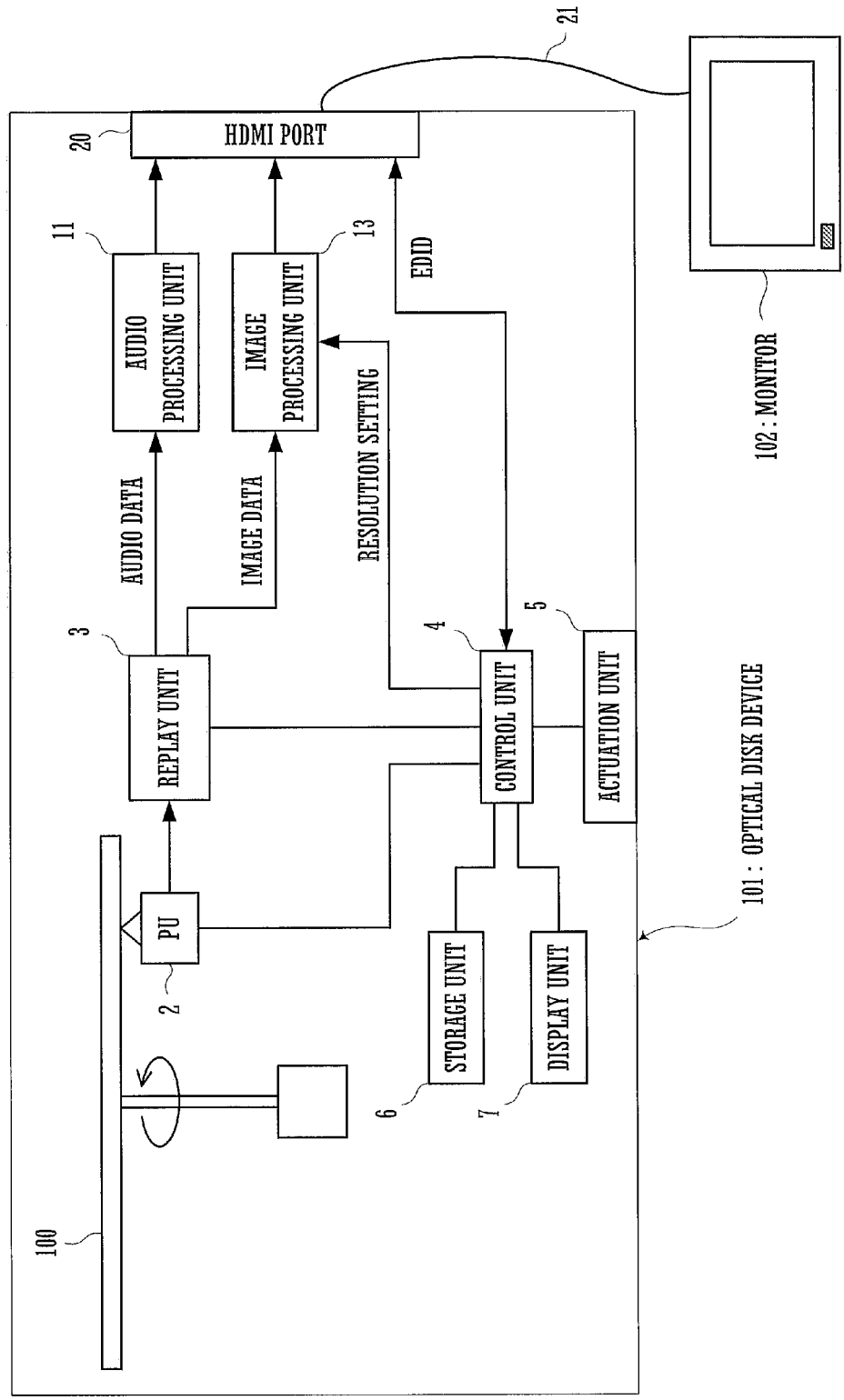
FIG. 1 is a block diagram showing the main structure of an optical disk device which is an embodiment of the present invention.

FIG. 1 is a block diagram showing the main structure of an optical disk device which is an embodiment of the present invention. This optical disk device 101 is a so called DVD player. The optical disk device 101 comprises: a control unit 4 which controls the operation of the various sections of the optical disk device 101; a pickup head 2 (hereinafter termed the PU head 2) which reads data from an optical disk 100; a replay unit 3 such as an RF amp or the like; an actuation unit 5 which receives actuation from the user; a display unit 7 which displays information; a storage unit 6 which stores data; an audio processing unit 11 which outputs an audio signal; an image processing unit 13 which converts an image signal to a predetermined resolution and then outputs the converted image signal; and an HDMI port 20.

Furthermore, this optical disk device 101 is connected to a monitor 102 via a HDMI cable 21 which is inserted into and connected to the HDMI port 20. This monitor 102 comprises an audio output unit which D/A converts the audio signal and emits sound to the exterior. Moreover, this monitor 102 is a monitor which is compatible with the HDMI standard.

It should be understood that although, in this embodiment, it is explained that the display device is the monitor 102, alternatively, it may also be a television.

HDMI is an interface for transmission of a digital image audio signal from an output device to a display device. The output device may be, for example, a DVD player. Furthermore, the display device may be, for example, a television image receiver or a projector type display device. HDMI is a standard according to which image information, audio information, and control information can all be transmitted via a single cable.

HDMI can send the information which is transmitted by the monitor 102 to the optical disk device 101 via DDC (Display Data Channel). DDC is the name of a communication format.

The PU head 2 comprises a laser diode (LD), a collimator lens, a beam splitter, an objective lens, a photodetector, a thread motor, and two shaft actuators, none of which are shown in the figures.

The LD is a light source which outputs laser light. And the photodetector comprises a plurality of light detection elements, and detects light reflected from the optical disk 100.

First, the operation during replay will be explained.

The PU head 2 irradiates laser light of read power upon the optical disk 100, and the light reflected from the optical disk 100 is detected by the photodetector. Due to this, the information which is recorded upon the optical disk 100 is optically read out.

The replay unit 3 generates a RF signal based upon the output of the plurality of light reception elements in the PU head 2. And the replay unit 3 amplifies this RF signal. Moreover, the replay unit 3 processes this RF signal, extracts the image data and the audio data therefrom, and decodes each of these data streams. Here, the image signal which is extracted is encoded in, for example, MPEG. Moreover, the audio signal which is extracted is encoded in, for example, AC3. And the replay unit 3 outputs the audio signal to the audio processing unit 11 and the image signal to the image processing unit 13, while maintaining synchronization between these two data streams.

The audio processing unit 11 outputs the expanded audio signal to the external monitor 102 as a digital replay audio signal.

On the other hand, the image processing unit 13 comprises a conversion unit which converts the expanded image signal to a resolution specified by the control unit 4. And the image processing unit 13 outputs this image signal to the external monitor 102 as a digital replay image signal.

Now this resolution conversion will be described in detail. If, for example, the image which is stored upon the optical disk 100 is 1280×1024 pixels, while the monitor 102 can display an image of 640×512 pixels, then, in this resolution conversion, the resolution in the horizontal direction is reduced by performing interpolation processing or the like. In this interpolation processing, for example, processing may be performed to read out the image signals for two pixels which are adjacent in the horizontal direction, to average them, and to output the result as the image signal for one pixel.

It should be understood that, here, the case will be explained in which the resolution of the image which is stored upon the optical disk 100 is less than or equal to the resolution specified by the control unit 4. For example, if the former resolution is 720 p and the latter resolution is 1020 p, or if both of these resolutions are 720 p, then the control unit 4 prevents resolution conversion by the image processing unit 13. Due to this, the image processing unit 13 is caused to be ineffective as a conversion unit. And the image processing unit 13 outputs the image signal which has been expanded to the external monitor 102 as a digital image replay signal.

The audio processing unit 11 and the image processing unit 13 transmit the above described digital signal to the monitor 102 by the TMDS (Transition Minimized Differential Signaling) method, via an HDMI cable 21.

The audio processing unit 11 and the image processing unit 13 are connected to the monitor 102 via the HDMI cable 21 which is inserted into and connected to the HDMI port 20. On this monitor 102, the user is able to view an image based upon the image signal which is outputted from the image processing unit 13, and to hear audio based upon the audio signal which is outputted from the audio processing unit 11.

FIG. 2 is an external view of the actuation unit 5 of this optical disk device which is an embodiment of the present invention. This actuation unit 5 is a device for the user to input various types of command to the optical disk device 101. On this actuation unit 5, there are provided various keys, including: a replay key (not shown in the figures) for causing replay of the optical disk 100 to be performed; a power supply key (also not shown in the figures) for changing over the power supply of the optical disk device 101 between ON and OFF; an automatic resolution setting key 51 for setting the resolution automatically; and resolution keys 52 through 54 for receiving input of individual resolutions among a first plurality of resolutions. The commands inputted by the user for the optical disk device are transmitted to the control unit 4.

The user actuates one of the resolution keys 52 through 54 shown in FIG. 2, and inputs the desired resolution. Thus, the user is able to input his desired resolution with a simple actuation operation.

It should be understood that although, in this embodiment, the resolutions which can be inputted are only progressive resolutions, in an actual implementation, it would also be acceptable for one or more of the resolutions which can be inputted to be an interlaced resolution.

Returning to FIG. 1, the storage unit 6 may comprise, for example, an EEPROM. This storage unit 6 stores a control program in which a control method for the various sections of the optical disk device 101 is described.

The display unit 7 may comprise, for example, an LCD (Liquid Crystal Display). This display unit 7 displays the current time, the setting state of the optical disk device 101, and the like.

The HDMI port 20 detects whether or not a monitor 102 is connected to the optical disk device 101 via the HDMI cable 21. In more detail, the HDMI cable 21 is endowed with a HPD (Hot Plug Detector) function. And the HDMI port 20 obtains information which indicates whether or not any monitor is connected via this HPD function. The HDMI port 20 transmits this information received via the HPD function as to whether or not any monitor is connected to the control unit 4, via a communication line which is internal to the optical disk device 101.

The control unit 4 comprises, for example, a microcomputer. Furthermore, this control unit 4 includes a RAM which serves as a working space for keeping data which is being processed by the control program described above. The control unit 4 controls the various sections of the optical disk device 101, according to commands inputted from the user to the optical disk device 101.

Here, the PU head 2 and the replay unit 3 correspond to the "read means" of the Claims. Moreover, the image processing unit 13 corresponds to the "conversion means" of the Claims. Furthermore, the HDMI port 20 and the HDMI cable 21 correspond to the "bidirectional type interface" of the Claims. And the display unit 7 corresponds to the "display means" of the Claims.

FIG. 3 is a flow chart showing the flow of operations performed by the control unit 4 of this optical disk device 101 which is an embodiment of the present invention. This operation is the operation when the user depresses the power supply key and the power supply to the optical disk device 101 is turned ON.

When the power supply key is depressed, the control unit 4 decides whether or not some device is connected to the HDMI port 20 (a step S1). If no device is connected to the HDMI port 20, then the control unit 4 terminates this processing.

On the other hand, if information to the effect that a connection between the optical disk device 101 and the monitor 102 is present is received from the HDMI port 20, the control unit 4 acquires, from the monitor 102, EDID (Extended Display Identification Data) for this monitor 102 via the HDMI cable 21 (a step S2). EDID is information which describes the specification and characteristics of the monitor 102. For example, resolution information and aspect ratio information are included in EDID. Such resolution information is information which describes a second plurality of resolutions with which the monitor 102 is compatible.

Next, the control unit 4 gets information about the second plurality of resolutions with which the monitor 102 is compatible from the EDID (a step S3).

And then the control unit 4 decides whether or not the resolution is being manually set by depression of one of the resolution keys 52 through 54 (a step S4).

Moreover the control unit 4 decides whether or not the resolution is being manually set by depression of the automatic resolution setting key 51 (a step S5).

Here, in these steps S4 and S5, the user is enabled to select whether the resolution will be set manually or automatically. If the user wishes to input a single resolution, then he depresses the desired one of the resolution keys 52 through 54.

If any one of the resolution keys 52 through 54 is depressed and a single resolution is inputted (the step S4), then the control unit 4 decides whether or not this input resolution is included in the second plurality of resolutions (a step S6). In other words, in this step S6, the control unit 4 decides whether or not the monitor 102 is compatible with this input resolution. In the following, the step S6 will be explained in more concrete terms. For example, if the resolutions with which the monitor 102 is compatible are 1080 p and 720 p, then, if the resolution key 53 is depressed, the control unit 4 decides that this input resolution is indeed included. Furthermore, if the resolutions with which the monitor 102 is compatible are 1080 p and 720 p, then, if the resolution key 52 is depressed, the control unit 4 decides that this input resolution is not included. Moreover, if the resolutions with which the monitor 102 is compatible are 720 p and 480 p, then, if the resolution key 54 is depressed, the control unit 4 decides that this input resolution is not included.

If it is decided that the input resolution is included in the second plurality of resolutions, then the control unit 4 specifies this input resolution to the image processing unit 13 (a step S7). For example, if the resolution key 53 is depressed, then the control unit 4 specifies the resolution 720 p to the image processing unit 13. In other words, if the monitor 102 is compatible with both the resolution 720 p and the resolution 1080 p, then the user is able to select the resolution 720 p. And, when replay of the optical disk 100 is commanded, the image processing unit 13 converts the image signal to the specified resolution and outputs the result to the monitor 102. For example, if the resolution of the image which is recorded upon the optical disk 100 is 1080 p, then, if the resolution key 53 is depressed, the image processing unit 13 converts the image signal to the resolution 720 p, and outputs the resulting signal to the monitor 102. At this time, the decision as to whether or not the monitor 102 is compatible with the resolution inputted by the user is performed in the step S6 before replay is performed. Due to this, the replay image is displayed upon the monitor 102 in an adequate manner.

On the other hand, if in the step S6 it is decided that the input resolution is not included in the second plurality of resolutions, or if in the step S5 it is decided that the resolution is to be set automatically, then the control unit 4 specifies the highest resolution from among the second plurality of resolutions to the image processing unit 13 (a step S8). For example, if the monitor 102 is compatible with both the resolution 720 p and the resolution 1080 p, then the control unit 4 specifies the resolution 1080 p to the image processing unit 13. The reason for providing this step S8 is that, if the user has inputted a resolution with which the monitor 102 is not compatible (such as for example 480 p), which is undesirable, then the replay image is not displayed upon the monitor 102 in an adequate manner.

By the above, the user is able to set the resolution manually, and moreover it is possible for the replay image to be displayed upon the monitor 102 in an adequate manner.

After the steps S7 and S8, the control unit 4 displays the specified resolution upon the display unit 7 (a step S9), and then this processing terminates. For example, if the resolution 720 p is the one which has been specified in the step S7, then the display unit 7 is caused to display a message to the effect that the current resolution is 720 p. Conversely, if the resolution 1080 p is the one which has been specified in the step S8, then the display unit 7 is caused to display a message to the effect that the current resolution is 1080 p. At this time, if the decision in the step S6 is negative and the resolution 1080 p has been designated in the step S8, then the control unit 4 may display a message upon the display unit 7, to the effect that the monitor 102 is not compatible with the input resolution.

By the above, it is possible for the user to be apprised of the currently set resolution of the monitor 102. Accordingly, the user is enabled to confirm, to which resolutions the monitor 102 can be set.

What is claimed is:

1. An optical disk device, comprising:
   read means which reads an image signal from an optical disk;
   conversion means which converts the image signal read by the read means to one resolution among a first plurality of resolutions;
   a bidirectional type interface which is connected to a display device which processes the image signal converted by the conversion means, and which displays an image upon a screen;
   actuation means which receives input of one resolution among the first plurality of resolutions; and
   control means which:
      acquires Extended Display Identification Data (EDID) of the display device from the display device via the interface; and
      acquires information, from the EDID, about a second plurality of resolutions with which the display device is compatible,
   wherein the control means:
      when the actuation means inputs one resolution, decides whether or not the input resolution is included in the second plurality of resolutions which have been acquired;
      when deciding that the input resolution is included in the second plurality of resolutions, designates the input resolution to the conversion means, and
      when deciding that the input resolution is not included in the second plurality of resolutions, designates the highest resolution among the second plurality of resolutions to the conversion means.

2. The optical disk device according to claim 1, further comprising a display means which displays information at a resolution specified by the conversion means.

3. The optical disk device according to claim 1, wherein the actuation means comprises a plurality of keys having different resolutions, and wherein input of one resolution among the first plurality of resolutions is received by actuation of the keys.

4. The optical disk device according to claim 1, wherein the EDID involves information showing resolution of the display device.

* * * * *